United States Patent
Wang et al.

(10) Patent No.: US 10,523,542 B2
(45) Date of Patent: Dec. 31, 2019

(54) SYSTEMS AND METHODS FOR TESTING INTEGRATED CLOUD INTEROPERABILITY, ADJACENT NETWORK COMPATIBILITY AND SERVICE CHAIN CONNECTIVITY

(71) Applicant: AT&T Intellectual Property I, L.P., Atlanta, GA (US)

(72) Inventors: Zhenzhen Wang, Holmdel, NJ (US); Teh-Hsin Wu, Holmdel, NJ (US); Xiangwei Zeng, Somerset, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 277 days.

(21) Appl. No.: 15/463,092

(22) Filed: Mar. 20, 2017

(65) Prior Publication Data

US 2018/0270130 A1 Sep. 20, 2018

(51) Int. Cl.
*G06F 15/173* (2006.01)
*H04L 12/26* (2006.01)
*H04L 12/24* (2006.01)
*H04L 29/08* (2006.01)

(52) U.S. Cl.
CPC ...... H04L 43/0811 (2013.01); H04L 41/0853 (2013.01); H04L 67/16 (2013.01)

(58) Field of Classification Search
CPC . H04L 41/08; H04L 41/0816; H04L 41/5096; H04L 41/0853; H04L 41/0873; H04L 41/5038; H04L 45/12
USPC .................................................. 709/223, 224
See application file for complete search history.

(56) References Cited

U.S. PATENT DOCUMENTS

| | | | |
|---|---|---|---|
| 7,933,212 B2 | 4/2011 | Qian et al. | |
| 9,083,606 B2 | 7/2015 | Qian et al. | |
| 9,130,864 B2 | 9/2015 | Keith | |
| 9,223,634 B2 * | 12/2015 | Chang | G06F 9/45558 |
| 2014/0215058 A1 | 7/2014 | Vicat-Blanc et al. | |
| 2015/0092564 A1 | 4/2015 | Aldrin | |
| 2015/0326469 A1 | 11/2015 | Kern et al. | |
| 2016/0127254 A1 | 5/2016 | Kumar et al. | |
| 2016/0248658 A1 | 8/2016 | Patel et al. | |
| 2016/0308762 A1 | 10/2016 | Teng et al. | |

FOREIGN PATENT DOCUMENTS

CN 104518899 A 4/2015

* cited by examiner

*Primary Examiner* — Wing F Chan
*Assistant Examiner* — Andrew Woo
(74) *Attorney, Agent, or Firm* — BakerHostetler

(57) ABSTRACT

A first integrated cloud is identified in a self-driven testing platform. The interoperability of the first integrated cloud with a plurality of other integrated clouds is tested. A service chain to verify a service chain path connectivity between the first integrated cloud and the plurality of other integrated clouds is created. Performance of the service chain is determined as is whether the service chain performance meets a benchmark requirement. If the service chain performance does not meet the benchmark requirement, service chain inventory data and adjacent neighbor connection information is retrieved. Real time network configuration data from the first integrated cloud and the plurality of other integrated clouds is retrieved and any mismatched network configuration data is compared and corrected.

18 Claims, 5 Drawing Sheets

SYSTEMS AND METHODS FOR TESTING INTEGRATED CLOUD INTEROPERABILITY, ADJACENT NETWORK COMPATIBILITY AND SERVICE CHAIN CONNECTIVITY

TECHNICAL FIELD

Embodiments of the subject matter described herein relate generally to computer systems and computer-implemented applications. More particularly, embodiments of the subject matter relate to testing methodologies suitable for use in testing integrated cloud interoperability, adjacent network compatibility and service chain connectivity.

BACKGROUND

Cloud computing is the delivery of computing services—servers, storage, databases, networking, software, analytics, and more—over the Internet ("the cloud"). Cloud computing provides computation, capacity, networking, and storage on demand. Computing resources such as computing (processing) machines, storage devices, and/or network devices may be simulated by one or more virtual machines (VMs). Several VMs may be hosted from a single physical hardware infrastructure resource (e.g., a server). Multiple virtual machines may be associated within a cloud infrastructure to form combinations of resources known as computing environments. Typical cloud computing service delivery may be based on a self-service usage model which allows a virtually unlimited amount of computing resources to be dynamically requisitioned, on demand, from a pool of shared computing resources. Thus, instead of grossly over-provisioning (or under-provisioning) initial, static computing resources due to uncertain demands, cloud computing may elastically provision infrastructure resources from the provider's pool only when needed.

Telecommunication carriers and network operators are deploying integrated cloud-based network infrastructure to transform their networks into software-based, service-centric networks. Software-Defined networks have many great advantages over legacy Time-Division Multiplexing (TDM) networks, including network-on-demand capabilities, better capacity management, and low-cost maintenance. However, SDN networks are more vulnerable to software configuration problems, network interoperability issues, and run-time errors. Due to the nature of network function virtualization, software outages, if not prevented or fixed at their early stage, will likely grow exponentially and may eventually knock customers out of service. Without a solution to this problem telecommunications companies, will have to allocate abundant network administration resources to conduct network troubleshooting and configurations.

Consequently there is a need for to have a platform that can automatically test integrated cloud interoperability, adjacent network compatibility, and service chain connectivity when a new or modified integrated cloud is deployed. There is a need for a platform that can auto-detect potential network outages, resolve them, and refresh networks when needed so that once the proposed platform is deployed, network administration resources for network maintenance can be reduced and network performance can be improved.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method including: identifying a first integrated cloud, testing the interoperability of the first integrated cloud with a plurality of other integrated clouds, creating a service chain to verify a service chain path connectivity between the first integrated cloud and the plurality of other integrated clouds, determining a service chain performance of the service chain, determining whether the service chain performance meets a benchmark requirement, if the service chain performance does not meet the benchmark requirement retrieving service chain inventory data and adjacent neighbor connection information, retrieving real time network configuration data from the first integrated cloud and the plurality of other integrated clouds, and comparing and correcting any mismatched network configuration data. Other embodiments of this aspect include corresponding computer systems, apparatus, and computer programs recorded on one or more computer storage devices, each configured to perform the actions of the methods.

One general aspect includes a system including: a first virtualized network function that monitors add-ons to a network, a first virtualized tool that tests interoperability of a plurality of integrated clouds, a second virtualized network function that simulates real-time network performance and a third virtualized network function that analyzes results from the first virtualized tool and the second virtualized network function and resets network settings.

One general aspect includes computer readable media, including program instructions executing on a computer, the program instructions including instructions for performing the steps of: identifying a newly added integrated cloud; testing the interoperability of the new integrated cloud with a plurality of other integrated clouds; creating a service chain to verify a service chain path connectivity between the new integrated cloud and the plurality of other integrated clouds; determining the performance of the service chain; determining whether the service chain performance meets a benchmark requirement; if the service chain performance does not meet the benchmark requirement retrieving service chain inventory data and adjacent neighbor connection information; retrieving real time network configuration data from the new integrated cloud and the plurality of other integrated clouds; and comparing and correcting any mismatched network configuration data.

DETAILED DESCRIPTION OF ILLUSTRATIVE EMBODIMENTS

Figure 1:
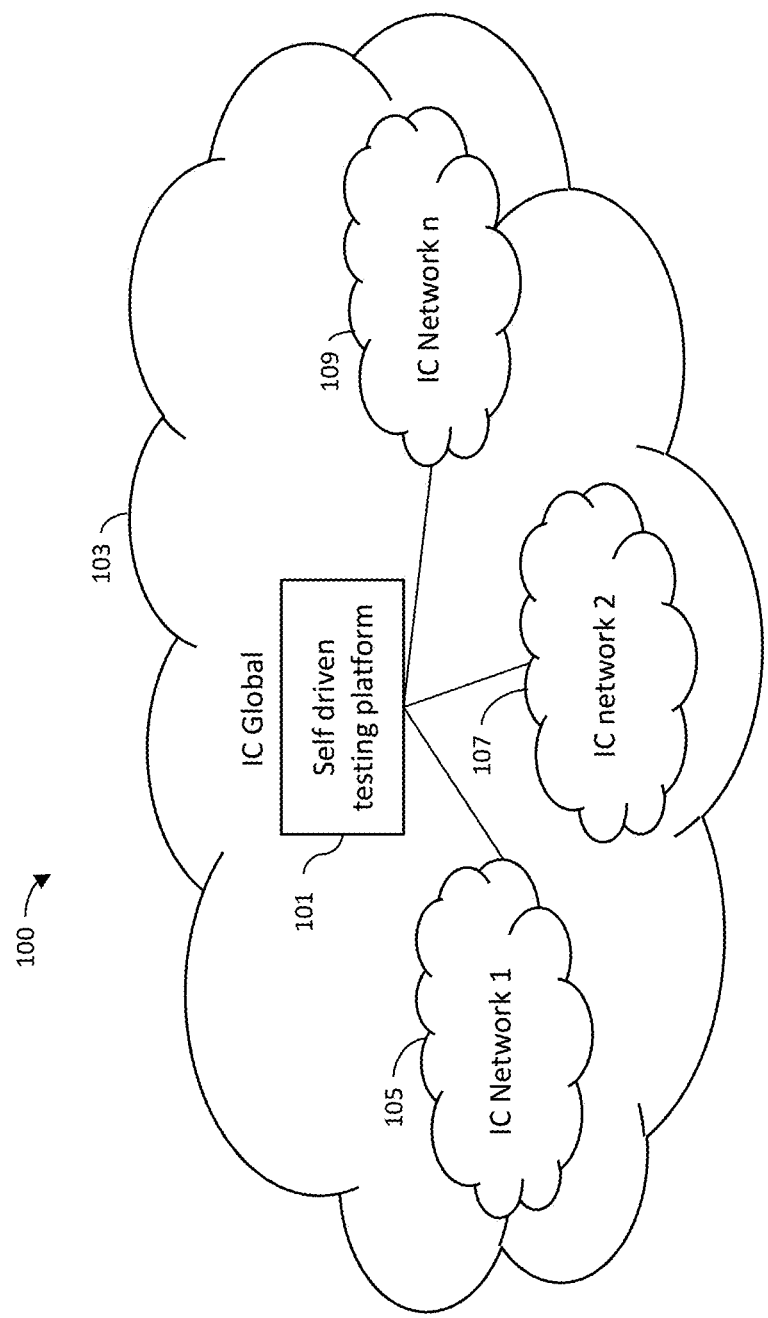
FIG. 1 is a block diagram of an integrated cloud architecture.

Illustrated in FIG. 1 is a network architecture 100 in which a self-driven testing platform 101 is implemented. The network architecture 100 includes a global integrated cloud network 103 and a plurality of integrated cloud (IC) networks, (IC network 1, IC network 2 and IC network n). For the proper functioning of the networks, IC network 1, IC network 2 and IC network n must maintain interoperability, adjacent network compatibility and service chain connectivity. This is particularly important whenever new IC networks are deployed.

Figure 2:
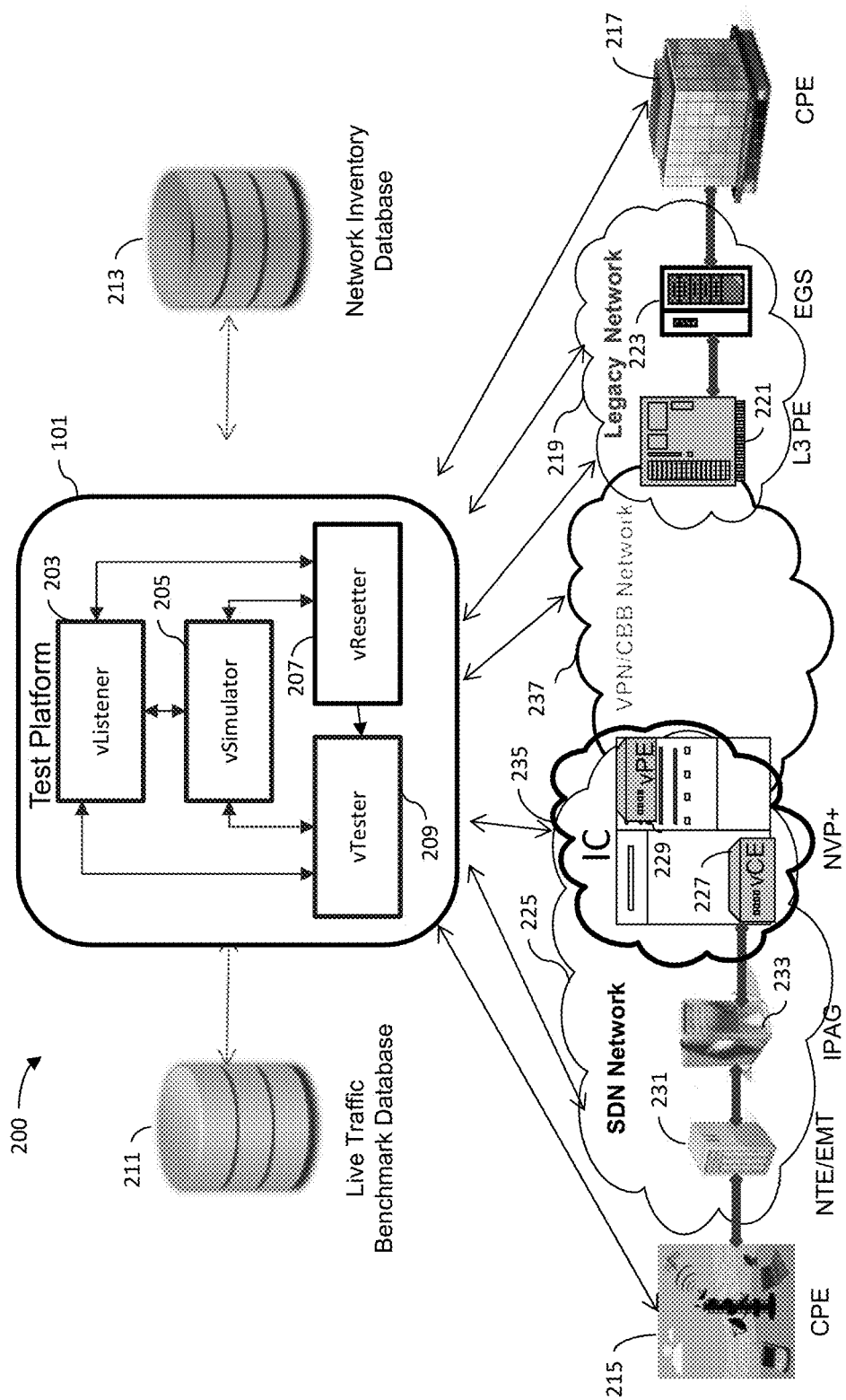
FIG. 2 is a block diagram of an embodiment of a self-driven testing platform for integrated clouds and the environment of operation for the self-driven testing platform.

Illustrated in FIG. 2 is the environment of operation 200 of the self-driven testing platform 101. The self-driven testing platform 101 is a tool to simulate, test, verify, and correct production network connections and configurations. The self-driven testing platform 101 includes a virtual listener (vListener module 203), a virtual simulator (vSimulator module 205), a virtual resetter (vResetter module 207), and a virtual tester (vTester module 209).

The vListener module 203 is a virtualized network function to monitor network add-ons. When a new IC network is added, the vListener module 203 obtains inventory data from a network inventory database 213 associated with new network layout as well service chain connectivity information. The vListener module 203 then activates other test platform components to perform cloud testing, simulating, and configuring functions to make sure the IC behaves as designed.

vTester module 209 is a virtualized tool to test IC interoperability among Data Plane, Control Plane, and Application Plane, verifies adjacent network compatibilities between the IC and transport connections, and scans service chain connectivity that traffic flows to complete a customer service order. For example, a Customer service order is normally represented by a circuit. For example, a T1 circuit, 1 Gig Ethernet circuit, and the like. The circuit contains service path data from a customer location A to customer location Z. Therefore, service path connects all the dots (devices, facilities, logical channels, or multiple ICs) from location A to Z. If the service speed is 1 GigE, the created service chain should support such speed. Thus service chain performance should meet the benchmark performance of a given circuit (or IP, PVC).

vSimulator module 205 is a virtualized network function to simulate real-time network performance including network resource allocation, load/soak performance, and service chain path connectivity.

vResetter module 207 is the brain that engages various APIs to analyze the results gathered by vTester and vSimulator, compare them against the benchmark data of each IC, and invoke vResetter to reset them to default settings. It may optimize service chain connectivity by engaging VMs along an open shortest path to customer premier location.

The self-driven testing platform 101 will monitor add-and-drop of IC networks, test network interoperability, and reset network configurations when needs arise. Once networks are in healthy condition, vSimulator module 205 will simulate service chain network path to verify an end-to-end service connectivity. It will compare the data from a simulated route/path based on a given IP address, permanent virtual circuit (PVC), or circuit with what has been provisioned in inventory system. If the tested service chain does not meet benchmark performance requirements, vResetter will automatically adjust network configurations and maximize network performance per service chain path in real time.

The self-driven testing platform 101 may interact with Customer premises equipment (CPE) 215 and 217, legacy network 219 that may include L3 PE routers 221 and Ethernet Gateway Switch (EGS 223). The self-driven testing platform 101 may also interact with a virtual private/Common Backbone (CBB) network 237. The self-driven testing platform 101 may also interact with a plurality of IS such as IC 235 which may include a plurality of virtual consumer edge devices (vCE 227) and a plurality of virtual provider edge devices (vPE 229). The self-driven testing platform 101 may also interact with a software defined network (SDN Network 225) that may include a plurality of network termination equipment (NTE/EMT 231) and a plurality of IPAG core network backbone packet switches (IPAG 233).

Figure 3:
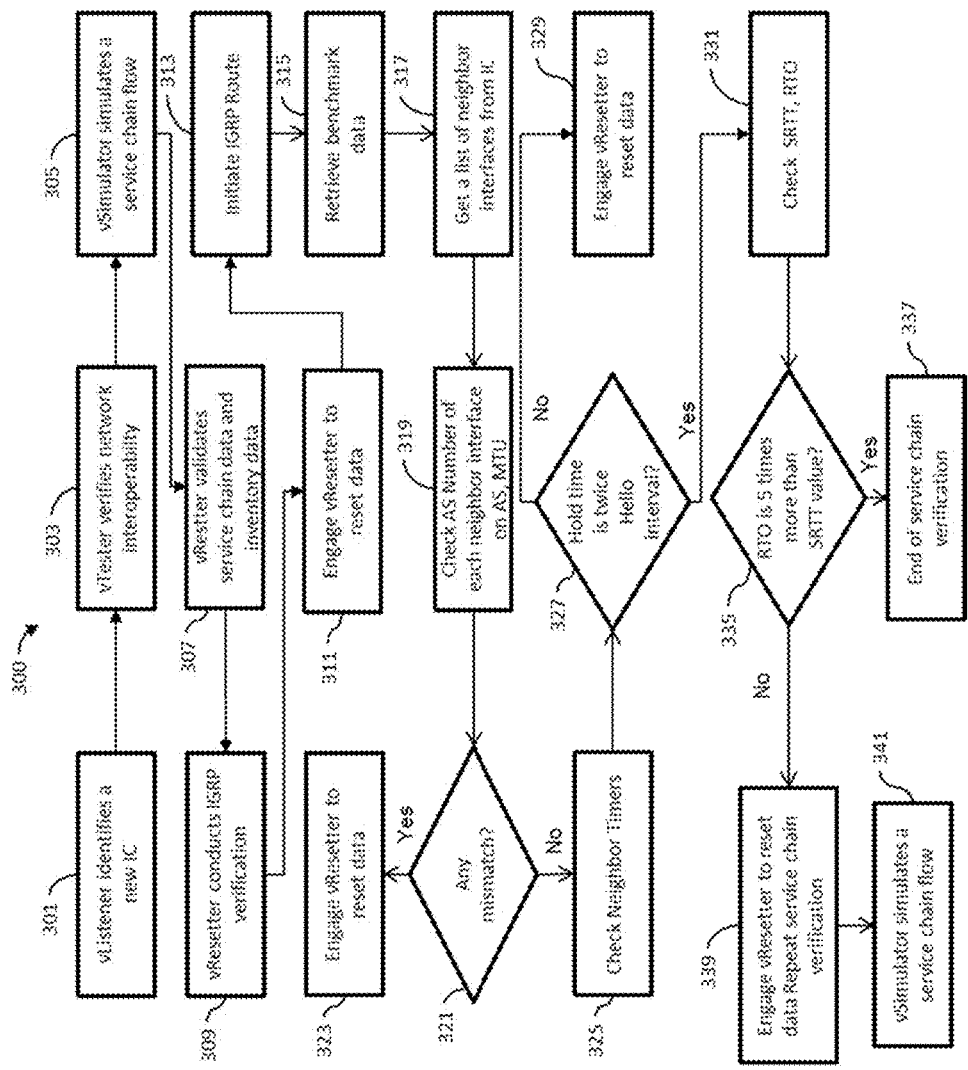
FIG. 3 is a flowchart of an embodiment of a method for automatically improving integrated cloud performance in the case of changes to an integrated cloud in a network.

Illustrated in FIG. 3 is a flowchart of an embodiment of a method 300 for improving network performance implemented by a self-driven testing platform 101 in case of Interior Gateway Routing Protocol (IGRP) configuration problem due to addition of a new IC in a global integrated cloud network 103.

In step 301 the vListener module 203 identifies a new IC has been added to the global integrated cloud network 103.

In step 303 the vTester module 209 verifies the network interoperability between new and existing ICs to validate network connectivity.

In step 305 the vSimulator module 205 simulates a service chain flow. Service chain indicates the logical connection from customer location A to location Z. Service chain connectivity connects all the dots (devices, facilities, logical channels, or multiple ICs) along the service path.

In step 307 the vResetter module 207 validates the service chain data and inventory data. For example, the service chain may find that the port speed of customer location A is 1 GigE in the real network but in inventory database it should be 10 GigE (customer circuit speed). In this case, the vResetter module 207 needs to update the port speed in the network or change to a different port.

In step 309 the vResetter module 207 conducts verification of the IGRP. In this step the real IGRP data is retrieved from network and that of inventory database and then the two are compared.

In step 311 the vResetter module 207 is engaged to reset the service chain data provisioned in the production networks according to the benchmark data.

In step 313 the IGRP route is initiated.

In step 315 benchmark data is retrieved. For example, the IGRP protocol may be pre-defined in the networks, which may include network IP Address, Gateway IP, and network interfaces.

In step 317 a list of neighboring interfaces is retrieved from the IC.

In step 319 the autonomous system (AS) number of each neighbor interface and maximum transmission unit (MTU) is checked against those from inventory database.

In step 321 a determination is made as to whether there's any mismatch between the AS number and MTU.

If there is a mismatch, the vResetter module 207 is engaged to reset the data in step 323 to match the AS number and MTU in the inventory database.

If there is no mismatch the system checks the neighbor timers (Hold time, RTO, SRTT, etc) in step 325.

In step 327 a determination is made whether the hold time is twice the Hello interval. Hello interval—Routing devices send hello packets at a fixed interval on all interfaces, including virtual links, to establish and maintain neighbor relationships. The hello interval specifies the length of time, in seconds, before the routing device sends a hello packet out of an interface. This interval must be the same on all routing devices on a shared network.

If the Hold time is not twice the Hello interval in the system engages the vResetter module 207 to reset the Hold time to the twice the Hello interval.

If the hold time is twice the hello interval, then in step 331 the system checks the smooth round-trip time (SRTT) (the time in milliseconds for a packet to be sent to a neighboring router and for the acknowledgement of that packet to come back to the local router) and the recovery time objectives (RTO) (the maximum tolerable length of time that a computer, system, network, or application can be down after a failure occurs).

In step 335 the system determines whether the RTO is five times more than the SRTT value.

If the RTO is five times more than the SRTT value in the system hence the service chain verification step 337.

If the RTO is not five times more than the SRT T value than the system engages vResetter module 207 to reset the RTO time to five times more than SRTT time and repeat service chain verification in step 339.

In step 341 the vSimulator module 205 simulates a service chain flow. The vSimulator module 201 uses a simulator that can send the traffic from customer location A to Z according to the customer circuit data. For example, it sends 10 Gig traffic/speed if the customer circuit is 10 GigE circuit. This traffic creates service chain flow that contains the port speed, PVC, device, facility, IC data along the network path.

Figure 4:
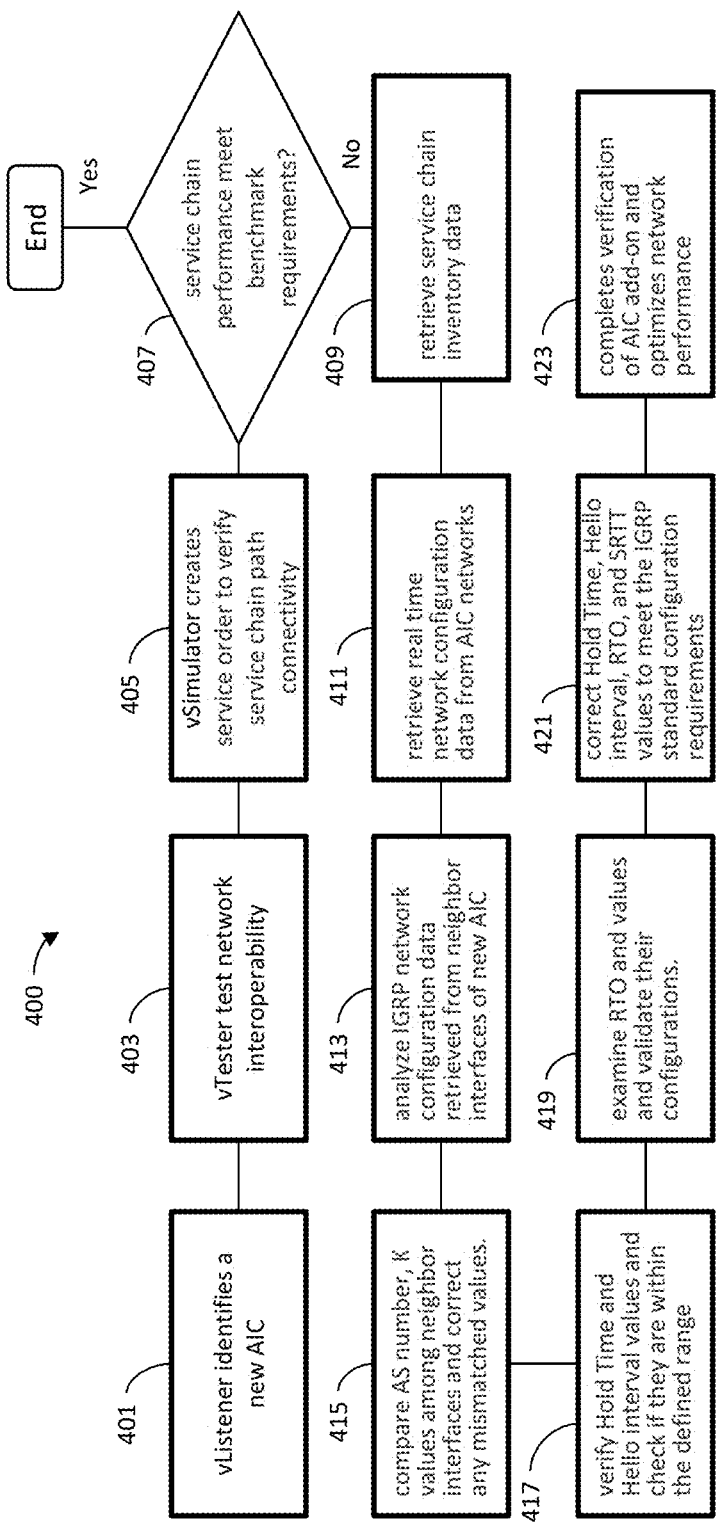
FIG. 4 is a flowchart of an embodiment of a method for automatically improving integrated cloud performance in the case of changes to an integrated cloud in a network.

Illustrated in FIG. 4 is an alternate embodiment of a method 400 for improving network performance implemented by a self-driven testing platform 101.

In step 401 the vListener module 203 identifies that a new IC has been added to the cloud networks.

In step 403 the vTester module 209 tests network interoperability between new and existing ICs to validate network connectivity.

In step 405 the vSimulator module 205 creates a service order based on an IP address, a permanent virtual circuit (PVC), or circuit to verify service chain path connectivity.

In step 407 vSimulator module 205 detects that the performance of the service chain does not meet the benchmark performance requirements.

In step 409 the vResetter module 207 retrieves service chain inventory data from Location A to Location Z including IP address, data from SDN Flow Table, and adjacent neighbor connection information including BGP (Border Gateway Protocol) and IGRP. Customer location A to Customer location Z may reside in one IC or multiple ICs.

In step 411 the vResetter module 207 automatically retrieves real time network configuration data from the IC networks.

In step 413 the vResetter module 207 automatically analyzes IGRP network configuration data retrieved from the neighbor interfaces of a new IC.

In step 415 the vResetter module 207 automatically compare AS (Autonomous System) number, MTU (Maximum Transmission Unit), K values (the metrics being used in IGRP to influence routes) among the neighbor interfaces and correct any mismatched values. AS, MTU, K values should be the same among adjacent neighbors. The data must be reset according to the benchmark data if any discrepancies are found.

In step 417 the vResetter module 207 automatically verifies Hold Time and Hello interval values and checks if they are within the defined range.

In step 419 the vResetter module 207 automatically examines RTO (Retransmission Time Out) and SRTT (Smooth Round Trip Time) values and validates their configurations.

In step 421 the vResetter module 207 automatically corrects Hold Time, Hello interval, RTO, and SRTT values to meet the IGRP standard configuration requirements.

In step 423 the Self-driven Testing Platform 101 completes verification of IC add-on and optimizes network performance.

Figure 5:
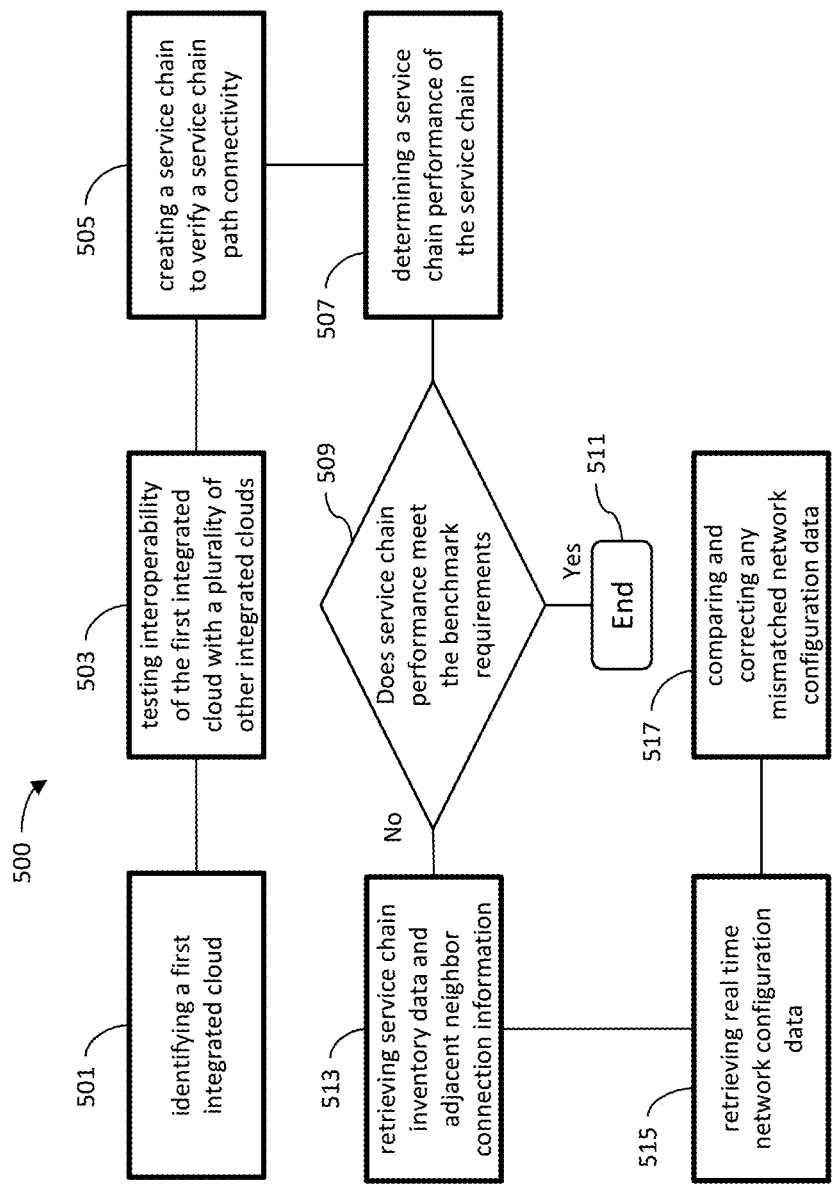
FIG. 5 is a flowchart of an embodiment of a method for automatically improving integrated cloud performance in the case of changes to an integrated cloud in a network.

Illustrated in FIG. 5 is a flowchart for is an alternate embodiment of a method 500 for improving network performance implemented by a self-driven testing platform 101.

In step 501 the self-driven testing platform 101 identifies a first integrated cloud. This may be achieved by a virtualized network function that monitors network add-ons. The first integrated cloud may be a new integrated cloud or a modified integrated cloud.

In step 503 the self-driven testing platform 101 tests the interoperability of the first integrated cloud with a plurality of other integrated clouds.

In step 505 the self-driven testing platform 101 creates a service chain to verify a service chain path connectivity between the first integrated cloud and the plurality of other integrated clouds. This may be accomplished by a virtualized tool that scans service chain conductivity. The self-driven testing platform 101 may retrieve service chain inventory data from a plurality of network locations including IP address, data from SDN Flow Table, and adjacent neighbor connection information In step 507 the self-driven testing platform 101 determines a service chain performance of the service chain.

In step 509 the self-driven testing platform 101 determines if the service chain performance does meets the benchmark requirement.

If the service chain performance does meets the benchmark requirement the process ends in step 511.

If the service chain performance does not meets the benchmark requirement then in step 513 the self-driven testing platform 101 retrieves service chain inventory data and adjacent neighbor connection information.

In step 515 the self-driven testing platform 101 retrieves real time network configuration data from the first integrated cloud and the plurality of other integrated clouds. The real time configuration data comprises IGRP network configuration data.

In step 517 the self-driven testing platform 101 compares and corrects any mismatched network configuration data.

As described above, the exemplary embodiments can be in the form of processor-implemented processes and devices for practicing those processes, such as a server in a regional network or cloud data center. The exemplary embodiments can also be in the form of computer program code containing instructions embodied in tangible media, such as floppy diskettes, CD ROMs, hard drives, or any other computer-readable storage medium, wherein, when the computer program code is loaded into and executed by a computer, the computer becomes a device for practicing the exemplary embodiments. The exemplary embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the exemplary embodiments. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims. Moreover, the use of the terms first, second, etc., do not denote any order or importance, but rather the terms first, second, etc., are used to distinguish one element from another. Furthermore, the use of the terms a, an, etc., do not denote a limitation of quantity, but rather denote the presence of at least one of the referenced item.

What is claimed:

1. A method comprising:
   identifying a first integrated cloud;
   testing the interoperability of the first integrated cloud with a plurality of other integrated clouds;
   creating a service chain to verify a service chain path connectivity between the first integrated cloud and the plurality of other integrated clouds;
   determining a service chain performance of the service chain;
   determining whether the service chain performance meets a benchmark requirement for a given circuit, permanent virtual circuit (PVC) or Internet Protocol (IP) address within the service chain;
   if the service chain performance does not meet the benchmark requirement, retrieving service chain inventory data from a plurality of network locations including IP address, data from software defined network (SDN) Flow Table, and adjacent neighbor connection information;
   retrieving real time network configuration data from the first integrated cloud and the plurality of other integrated clouds; and
   comparing and correcting any mismatched network configuration data.

2. The method of claim 1 wherein the real time network configuration data comprises Interior Gateway Routing Protocol (IGRP) network configuration data.

3. The method of claim 1 wherein the first integrated cloud is a new integrated cloud.

4. The method of claim 1 wherein the first integrated cloud is a modified integrated cloud.

5. The method of claim 1 wherein identifying the first integrated cloud is achieved by a virtualized network function that monitors network add-ons.

6. The method of claim 1 wherein creating the service chain is achieved by a virtualized tool that scans service chain connectivity.

7. A system comprising:
   a processor;
   a first virtualized network function coupled to the processor that monitors add-ons to a network;
   a first virtualized tool coupled to the processor that tests interoperability of a plurality of integrated clouds;
   a second virtualized network function coupled to the processor that simulates real-time network performance; and
   a third virtualized network function coupled to the processor that analyzes results from the first virtualized tool and the second virtualized network function and resets network settings;
   a memory for storing computer instructions, wherein the processor, responsive to executing the computer instructions, performs operations comprising:
      identifying a first integrated cloud from the plurality of integrated clouds;
      testing the interoperability of the first integrated cloud with other integrated clouds from the plurality of integrated clouds;
      creating a service chain to verify a service chain path connectivity between the first integrated cloud and the other integrated clouds;
      determining a service chain performance of the service chain;
      determining whether the service chain performance meets a benchmark requirement for a given circuit, permanent virtual circuit (PVC) or Internet Protocol (IP) address within the service chain;
      if the service chain performance does not meet the benchmark requirement, retrieving service chain inventory data from a plurality of network locations including IP address, data from software defined network (SDN) Flow Table, and adjacent neighbor connection information;
      retrieving real time network configuration data from the first integrated cloud and the plurality of other integrated clouds; and
      comparing and correcting any mismatched network configuration data.

8. The system of claim 7 wherein the first virtualized network function obtains inventory data associated with a new network layout when a new integrated cloud is added to the network.

9. The system of claim 7 wherein the first virtualized tool tests the plurality of other integrated clouds interoperability among a data plane, a control plane and an application plane.

10. The system of claim 7 wherein the first virtualized tool verifies adjacent network compatibilities between the integrated cloud and transport connections, and scans service chain connectivity.

11. The system of claim 7 wherein the real-time network performance comprises network resource allocation, load/soak performance and service chain connectivity.

12. The system of claim 7 wherein the third virtualized network function compares the analyzed results from the first virtualized tool and the second virtualized network function against benchmark data of each of the plurality of integrated clouds.

13. The system of claim 7 wherein the third virtualized network function resets the results to default settings.

14. A non-transitory computer readable media, including program instructions executing on a computer, the program instructions including instructions for performing the steps of:

identifying a first integrated cloud;
testing the interoperability of the first integrated cloud with a plurality of other integrated clouds;
creating a service chain to verify a service chain path connectivity between the first integrated cloud and the plurality of other integrated clouds;
determining a service chain performance of the service chain;
determining whether the service chain performance meets a benchmark requirement for a given circuit, permanent virtual circuit (PVC) or Internet Protocol (IP) address within the service chain;
if the service chain performance does not meet the benchmark requirement, retrieving service chain inventory data from a plurality of network locations including IP address, data from software defined network (SDN) Flow Table, and adjacent neighbor connection information;
retrieving real time network configuration data from the first integrated cloud and the plurality of other integrated clouds; and
comparing and correcting any mismatched network configuration data.

15. The computer readable media of claim 14 wherein the real time network configuration data comprises IGRP network configuration data.

16. The computer readable media of claim 14 wherein the first integrated cloud is a new integrated cloud.

17. The computer readable media of claim 14 wherein the first integrated cloud is a modified integrated cloud.

18. The computer readable media of claim 14 wherein identifying the first integrated cloud is achieved by a virtualized network function that monitors network add-ons.

* * * * *